United States Patent [19]

Yeh et al.

[11] Patent Number: 5,776,286

[45] Date of Patent: Jul. 7, 1998

[54] HOLOGRAM MANUFACTURING PROCESS AND METHOD FOR EFFICIENTLY PROVIDING A MULTI-HOLOGRAPHIC OPTICAL ELEMENT SUBSTRATE UNIT

[75] Inventors: Jang-Hun Yeh, Streamwood; Karl W. Wyatt, Cary, both of Ill.; Terry Rohde, Delray Beach, Fla.

[73] Assignee: Motorola, Inc., Schaumburg, Ill.

[21] Appl. No.: 791,076

[22] Filed: Jan. 29, 1997

[51] Int. Cl.$^6$ ..................................................... B32B 31/00
[52] U.S. Cl. ........................ 156/256; 156/257; 156/353; 156/556; 359/1
[58] Field of Search ..................................... 156/556, 250, 156/256, 257, 264, 268, 269, 270, 353, 354, 355; 359/1

[56] References Cited

U.S. PATENT DOCUMENTS 4,904,033  2/1990  Ikeda et al.
4,978,593  12/1990  Yin et al.
4,995,685  2/1991  Armstrong et al.
4,999,075  3/1991  Coburn, Jr. ............... 156/270 X
5,330,264  7/1994  Ando et al.

*Primary Examiner*—James Engel
*Attorney, Agent, or Firm*—Darleen J. Stockley

[57] ABSTRACT

The present invention provides a manufacturing process (600) and method (500) for efficiently providing a multi-holographic optical element substrate unit. Upon preparation of an original continuous/non-continuous holographic optical element with uniform diffraction efficiency and marking the original continuous/non-continuous holographic optical element with predetermined alignment marks, the original continuous/non-continuous holographic optical element is cut into a predetermined number of individual holographic optical elements in accordance with the predetermined alignment marks. Then a substrate is prepared with alignment marks in accordance with the predetermined alignment marks of the individual holographic optical elements, and the individual holographic optical elements are attached to a substrate in accordance with the alignment marks.

14 Claims, 4 Drawing Sheets

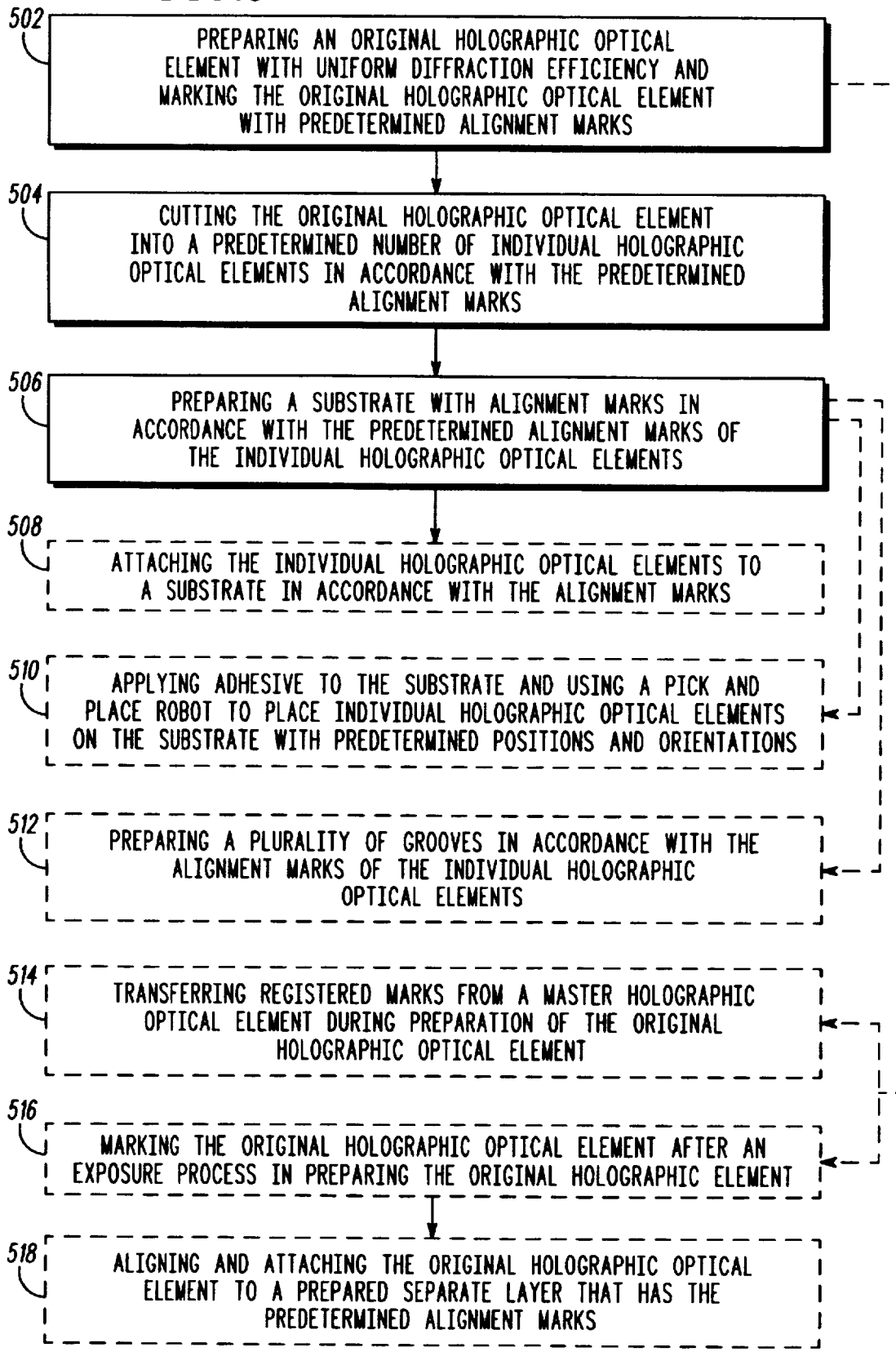

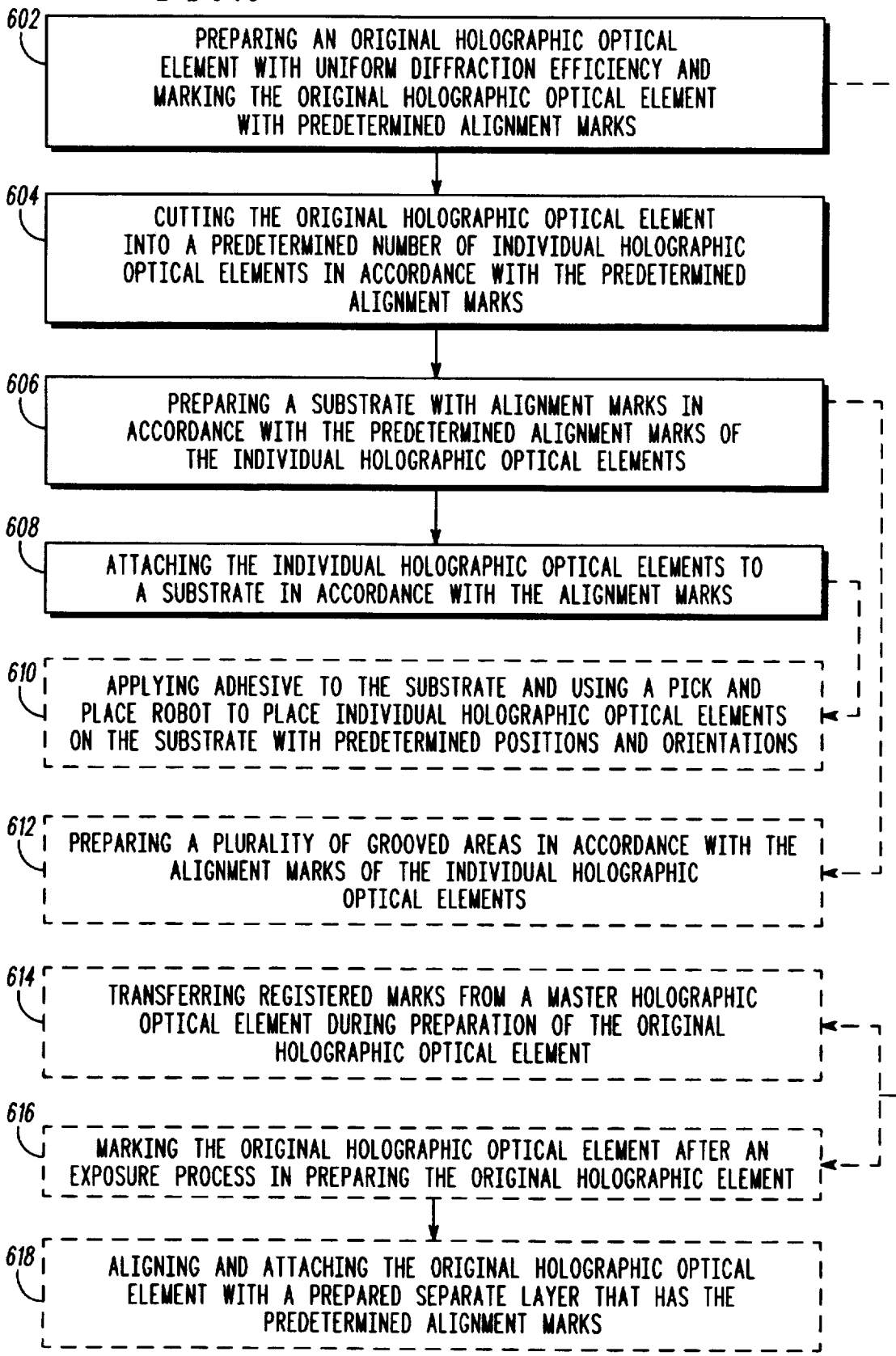

HOLOGRAM MANUFACTURING PROCESS AND METHOD FOR EFFICIENTLY PROVIDING A MULTI-HOLOGRAPHIC OPTICAL ELEMENT SUBSTRATE UNIT

FIELD OF THE INVENTION

The present invention relates generally to holographic optical elements, and more particularly, to the manufacture of multi-holographic optical element substrate units.

BACKGROUND OF THE INVENTION

It is well known that specially designed holographic optical elements can be used to replace bulky and expensive traditional optical components made of glass and plastics. For example, holographic optical elements can be designed to perform reflecting (to replace mirrors), beam splitting (to replace beam splitters), and collimating or focusing (to replace lenses) functions in an optical systems. Since the holographic optical elements are fabricated on a thin layer of photosensitive film by interference of optical beams, the weight and size of the elements are greatly reduced. The reduced size of optical components enables a more compact optical system package with more functionality.

It is known in the art how to mass-produce a plurality of holographic optical elements that may be used to provide holograms. Typically, the interference pattern of at least two optical waves is recorded in a photosensitive film to produce the holograms, and a plurality of holograms are then produced by repetitive steps. The recording method includes the copying of a master hologram or optical components such as mirrors, prisms, or lenses. During the recording process, the master hologram or optical components must be attached to the film with index matching fluid before exposure and then removed from the film after exposure The attaching and removal process is very time- consuming and may increase the required settling time before the next exposure due to mechanical vibration. Also, an additional process is required to clean the index matching fluid after exposure. For mass production of holograms, these attaching-removal-cleaning processes have become the bottleneck to the overall throughput in the manufacturing flow. In addition, individual holographic optical elements may not be identical due to manufacturing variation in each process step.

After the hologram is fabricated, usually it is attached to a substrate in different system applications. For example, a graphic art hologram may be attached to a glass or plastic substrate for display; a holographic optical element for automobile application may be attached to the windshield of a car; a lens holographic optical element may be attached to a flat substrate in an optical system. Typically, the finished hologram is glued to the substrate manually with little control of positioning and alignment accuracy. The positioning and alignment errors cause a change in diffraction efficiency and diffraction angle, and may greatly affect the system performance.

Thus, there is a need for an efficient manufacturing process and method for providing a multi-holographic optical element substrate unit with required positioning and alignment accuracy.

BRIEF DESCRIPTION OF THE DRAWINGS

FIG. 5 is a flow chart showing one embodiment of steps of a method for efficiently providing a multi-holographic optical element substrate unit in accordance with the present invention.

FIG. 6 shows one embodiment of steps for a process for manufacturing a multi-holographic optical element substrate unit in accordance with the present invention.

DETAILED DESCRIPTION OF A PREFERRED EMBODIMENT

Figure 1:
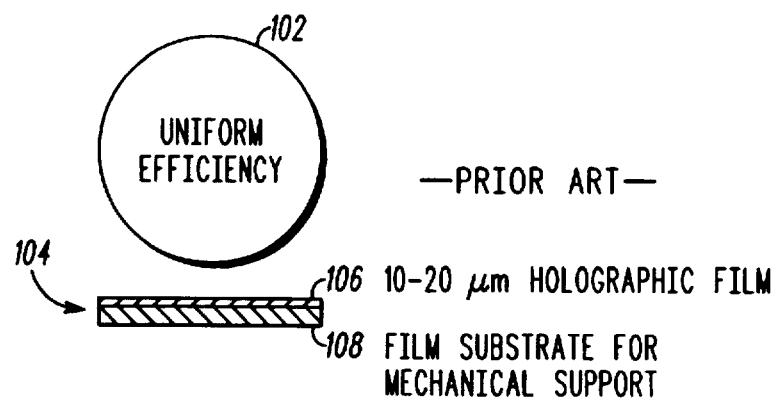
FIG. 1 is a diagrammatic representation of a top view and a side view of a typical original holographic optical element substrate unit having a uniform diffraction efficiency.

FIG. 1, numeral 100, is a diagrammatic representation of a top view (102) and a side view (104) of a typical original holographic optical element substrate unit (102) having a uniform diffraction efficiency. Generally, the original holographic optical element substrate unit includes a 10–20 micrometer thickness holographic film (106) situated on a film substrate (108) for mechanical support. In some embodiments the original holographic optical element substrate unit (102) may have a protective layer. Also, where selected, the original holographic optical element substrate unit (102) may contain a plurality of non-continuous two-dimensional arrays of identical individual holograms.

Figure 2:
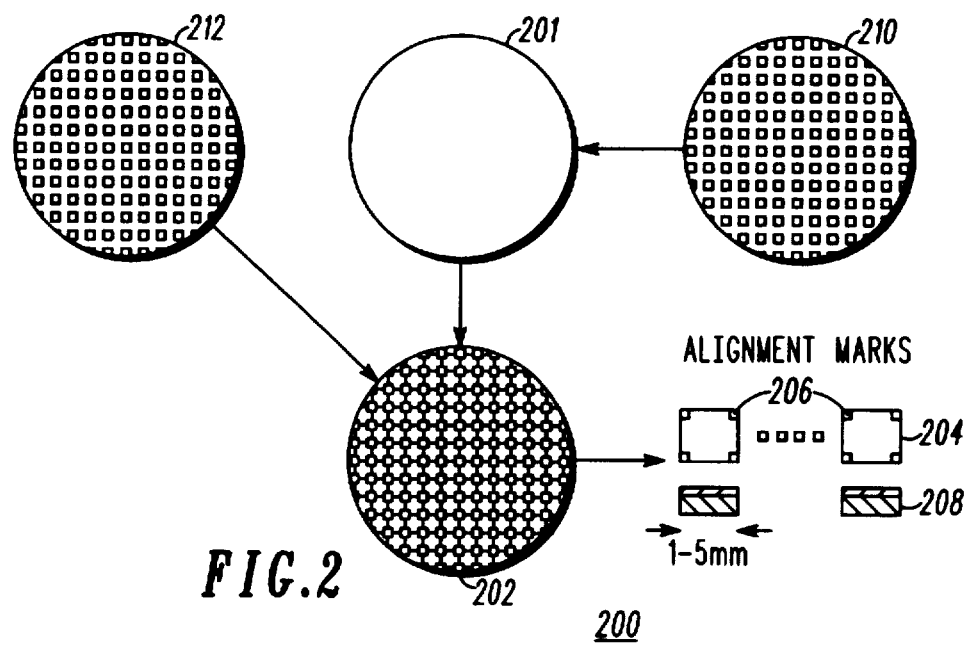
FIG. 2 is a diagrammatic representation of a top view and a side view of a plurality of individual holographic optical elements having alignment marks in accordance with the present invention.

FIG. 2, numeral 200, is a diagrammatic representation of a top view (202) and a side view (208) of a plurality of individual holographic optical elements (204) having alignment marks (206) in accordance with the present invention. The original holographic optical element substrate unit of FIG. 1 is divided into the plurality of individual holographic optical elements (204). Generally, a workable width of the individual holographic optical elements (204) is one to 5 millimeters. Typically, the thickness of the holographic film may be from 1 to 200 micrometers.

Figure 3:
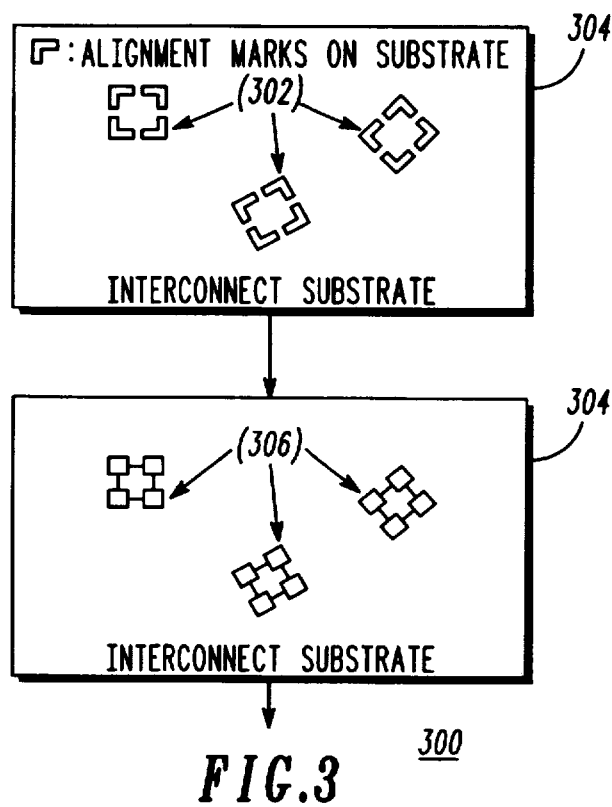
FIG. 3 is a diagrammatic representation of an interconnect substrate having alignment marks for placement of individual holographic optical elements in accordance with the present invention.

FIG. 3, numeral 300, is a diagrammatic representation of an interconnect substrate having alignment marks (302) for placement of individual holographic optical elements (306) in accordance with the present invention. The optical interconnect substrate (304) is typically marked with alignment marks (302) to show the positioning for each of a plurality of individual holographic optical elements (306). Then each of the plurality of individual holographic optical elements (306) is aligned with the alignment marks (302) and glued in place.

Figure 4:
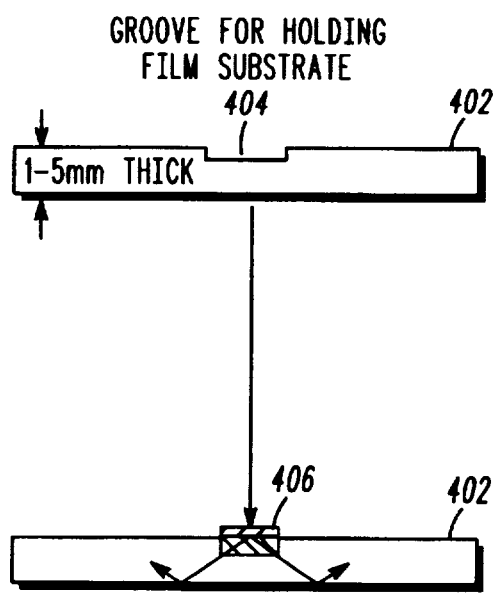
FIG. 4 is a diagrammatic representation of a side view of an interconnect substrate showing one of a plurality of predetermined grooved areas wherein each predetermined grooved area holds an individual holographic optical element in accordance with the present invention.

FIG. 4, numeral 400, is a diagrammatic representation of a side view of an interconnect substrate (402) showing one of a plurality of predetermined grooved areas (404) wherein each predetermined grooved area holds an individual holographic optical element (406) in accordance with the present invention. A workable thickness of the interconnect substrate (402) is generally 1 to 5 millimeters. Each of the plurality of individual holographic optical elements is placed in a predetermined grooved area (404) and glued in place. An exemplary individual holographic optical element (406) is shown place in an exemplary predetermined grooved area (404) in FIG. 4.

FIG. 5, numeral 500, is a flow chart showing one embodiment of steps of a method for efficiently providing a multi-holographic optical element substrate unit in accordance with the present invention. The method includes the steps of: A) preparing (502) an original continuous/non-continuous holographic optical element with uniform diffraction efficiency and marking the original holographic optical element with predetermined alignment marks (marking is accomplished directly or by attaching another marked layer); B) cutting (504) the original continuous/non-continuous holographic optical element into a predetermined number of individual holographic optical elements in accordance with the predetermined alignment marks; C) preparing (506) a substrate with alignment marks in accordance with the predetermined alignment marks of the individual holographic optical elements; D) attaching (508) the individual holographic optical elements to the substrate in accordance with the alignment marks.

Where selected, the step of attaching the individual holographic optical elements to a substrate in accordance with the alignment marks may include applying adhesive (510) to the substrate and using a pick and place robot to place individual holographic optical elements on the substrate with predetermined positions and orientations.

In addition, the step of preparing a substrate with alignment marks in accordance with the predetermined alignment marks of the individual holographic optical elements may be selected to include preparing a plurality of grooves (512) in accordance with the alignment marks of the individual holographic optical elements.

Also, the step of preparing an original holographic optical element with uniform diffraction efficiency and marking the original holographic optical element with predetermined alignment marks may include one of: A) transferring (514) registered marks from a master holographic optical element during preparation of the original holographic optical element (212 in FIG. 2 shows a marked holographic optical element); and B) marking (516) the original holographic optical element after an exposure process in preparing the original holographic optical element. As shown in FIG. 2, marking (516) the original holographic optical element after an exposure process in preparing the original holographic element may include aligning and attaching (518) the original holographic optical element (201) to a prepared separate layer (210) that has the predetermined alignment marks. The alignment marks may further provide coded information for different types of holographic elements.

FIG. 6, numeral 600, shows one embodiment of steps for a process for manufacturing a multi-holographic optical element substrate unit in accordance with the present invention. The process includes the steps of: A) preparing (602) an original continuous/non-continuous holographic optical element with uniform diffraction efficiency and marking the original holographic optical element with predetermined alignment marks; B) cutting (604) the original continuous/non-continuous holographic optical element into a predetermined number of individual holographic optical elements in accordance with the predetermined alignment marks; C) preparing (606) a substrate with alignment marks in accordance with the predetermined alignment marks of the individual holographic optical elements; and D) attaching (608) the individual holographic optical elements to a substrate in accordance with the alignment marks. The process of attaching the individual holographic optical elements to the substrate in accordance with the alignment marks may include utilizing an optical detection system to determine an orientation of individual holographic elements during transportation of each individual holographic element to the substrate.

Attaching the individual holographic optical elements to a substrate in accordance with the alignment marks may include applying adhesive (610) to the substrate and using a pick and place robot to place individual holographic optical elements on the substrate with predetermined positions and orientations.

Preparing a substrate with alignment marks in accordance with the predetermined alignment marks of the individual holographic optical elements may be selected to include preparing (612) a plurality of grooved areas in accordance with the alignment marks of the individual holographic optical elements.

In addition, preparing an original continuous/non-continuous holographic optical element with uniform diffraction efficiency and marking the original holographic optical element with predetermined alignment marks may include one of: A) transferring (614) registered marks from a master holographic optical element during preparation of the original holographic optical element (212 in FIG. 2 shows a marked holographic optical element); and B) marking (616) the original holographic optical element after an exposure process in preparing the original holographic optical element. As shown in FIG. 2, marking (616) the original holographic optical element after an exposure process in preparing the original holographic element may include aligning and attaching (618) the original holographic optical element (201) to a prepared separate layer (210) that has the predetermined alignment marks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for efficiently providing a multi-holographic optical element substrate unit, comprising the steps of:

A) preparing an original holographic optical element with uniform diffraction efficiency and marking the original holographic optical element with predetermined alignment marks;

B) cutting the original holographic optical element into a predetermined number of individual holographic optical elements in accordance with the predetermined alignment marks;

C) preparing a substrate with alignment marks in accordance with the predetermined alignment marks of the individual holographic optical elements; and D) attaching the individual holographic optical elements to a substrate in accordance with the alignment marks of the individual holographic optical elements and the substrate.

2. The method of claim 1 wherein attaching the individual holographic optical elements to a substrate in accordance with the alignment marks includes applying adhesive to the substrate and using a pick and place robot to place individual holographic optical elements on the substrate with predetermined positions and orientations.

3. The method of claim 1 wherein preparing a substrate with alignment marks in accordance with the predetermined alignment marks of the individual holographic optical elements includes preparing a plurality of grooved areas in accordance with the alignment marks of the individual holographic optical elements.

4. The method of claim 1 wherein preparing the original continuous/non-continuous holographic optical element with uniform diffraction efficiency and marking the original holographic optical element with predetermined alignment marks includes one of:
   A) transferring registered marks from a master holographic optical element during preparation of the original holographic optical element; and
   B) marking the original continuous/non-continuous holographic optical element after an exposure process in preparing the original holographic element.

5. The method of claim 4 wherein marking the original continuous/non-continuous holographic optical element after an exposure process in preparing the original holographic element includes aligning and attaching the original holographic optical element to a prepared separate layer that has the predetermined alignment marks.

6. The method of claim 1 wherein the alignment marks further provide coded information for different types of holographic elements.

7. The method of claim 1 wherein attaching the individual holographic optical elements to the substrate in accordance with the alignment marks includes utilizing an optical detection system to determine an orientation of individual holographic elements during transportation of each individual holographic element to the substrate.

8. A process for manufacturing a multi-holographic optical element substrate unit, comprising the steps of:
   A) preparing an original holographic optical element with uniform diffraction efficiency and marking the original holographic optical element with predetermined alignment marks;
   B) cutting the original holographic optical element into a predetermined number of individual holographic optical elements in accordance with the predetermined alignment marks;
   C) preparing a substrate with alignment marks in accordance with the predetermined alignment marks of the individual holographic optical elements; and
   D) attaching the individual holographic optical elements to the substrate in accordance with the alignment marks of the individual holographic optical elements and the substrate.

9. The process of claim 8 wherein attaching the individual holographic optical elements to a substrate in accordance with the alignment marks includes applying adhesive to the substrate and using a pick and place robot to place individual holographic optical elements on the substrate with predetermined positions and orientations.

10. The process of claim 8 wherein preparing a substrate with alignment marks in accordance with the predetermined alignment marks of the individual holographic optical elements includes preparing a plurality of grooved areas in accordance with the alignment marks of the individual holographic optical elements.

11. The process of claim 8 wherein preparing the original continuous/non-continuous holographic optical element with uniform diffraction efficiency and marking the original continuous/non-continuous holographic optical element with predetermined alignment marks includes one of:
   A) transferring registered marks from a master holographic optical element during preparation of the original holographic optical element; and
   B) marking the original continuous/non-continuous holographic optical element after an exposure process in preparing the original holographic element.

12. The process of claim 11 wherein marking the original continuous/non-continuous holographic optical element after an exposure process in preparing the original continuous/non-continuous holographic element includes aligning the original holographic optical element with a prepared separate layer that has the predetermined alignment marks.

13. The process of claim 8 wherein attaching the individual holographic optical elements to the substrate in accordance with the alignment marks includes utilizing an optical detection system to determine an orientation of individual holographic elements during transportation of each individual holographic element to the substrate.

14. The method of claim 8 wherein the alignment marks further provide coded information for different types of holographic elements.

* * * * *